(12) United States Patent
Dennert

(10) Patent No.: US 6,269,155 B1
(45) Date of Patent: Jul. 31, 2001

(54) PROCESS FOR MAKING CONNECTIONS AND ACCOUNTING FOR CONNECTIONS IN TELECOMMUNICATION SYSTEMS

(75) Inventor: Thomas Dennert, Troisdorf (DE)

(73) Assignee: DeTemobil Deutsche Telekom Mobilnet GmbH, Bonn (DE)

( * ) Notice: Subject to any disclaimer, the term of this patent is extended or adjusted under 35 U.S.C. 154(b) by 0 days.

(21) Appl. No.: 09/125,999

(22) PCT Filed: Mar. 1, 1997

(86) PCT No.: PCT/EP97/01034

§ 371 Date: Apr. 26, 1999

§ 102(e) Date: Apr. 26, 1999

(87) PCT Pub. No.: WO97/33439

PCT Pub. Date: Sep. 12, 1997

(30) Foreign Application Priority Data

Mar. 5, 1996 (DE) .............................. 196 08 419

(51) Int. Cl.⁷ ........................... H04M 15/00; H04M 3/42
(52) U.S. Cl. ........................... 379/112; 379/114; 379/201; 379/216; 455/414
(58) Field of Search .................................... 379/112, 113, 379/114, 144, 216, 201, 207; 455/405, 406, 407, 408, 414

(56) References Cited

U.S. PATENT DOCUMENTS

| | | | | |
|---|---|---|---|---|
| 5,204,894 | * | 4/1993 | Darden | 379/216 |
| 5,206,899 | * | 4/1993 | Gupta et al. | 379/120 |
| 5,259,026 | * | 11/1993 | Johnson | 379/207 |
| 5,325,424 | * | 6/1994 | Grube | 379/94 |
| 5,479,494 | * | 12/1995 | Clitherow | 379/144 |
| 5,509,058 | * | 4/1996 | Sestak et al. | 379/201 |
| 5,703,942 | * | 12/1997 | Pinard et al. | 379/207 |
| 5,717,738 | * | 2/1998 | Gammel | 379/67 |
| 5,719,926 | * | 2/1998 | Hill | 379/113 |
| 5,732,132 | * | 3/1998 | Hamada | 379/354 |
| 5,758,286 | * | 5/1998 | Leppanen | 455/445 |
| 5,771,279 | * | 6/1998 | Cheston, III et al. | 379/93.17 |
| 5,778,054 | * | 7/1998 | Kimura et al. | 379/93.23 |
| 5,907,609 | * | 5/1999 | Jeon | 379/216 |
| 5,974,133 | * | 10/1999 | Fleischer, III et al. | 379/230 |
| 6,169,797 | * | 1/2001 | Wildgrube et al. | 379/201 |

* cited by examiner

Primary Examiner—Curtis Kuntz
Assistant Examiner—Quoc D. Tran
(74) Attorney, Agent, or Firm—Cooper & Dunham LLP

(57) ABSTRACT

A method for call establishment and for the accounting of calls in telecommunications networks wherein specified destination call numbers are stored in a database situated in a service node of a communications network and the database can be accessed by a subscriber by dialing a service identification number.

9 Claims, 2 Drawing Sheets

PROCESS FOR MAKING CONNECTIONS AND ACCOUNTING FOR CONNECTIONS IN TELECOMMUNICATION SYSTEMS

FIELD OF THE INVENTION

The invention describes a method for call establishment and for the accounting of calls in telecommunications networks for specified destination call numbers which can be selected individually by the subscriber.

BACKGROUND OF THE INVENTION

In numerous telecommunications networks the need exists to subject telecommunications calls to call destinations which can be individually specified by the subscriber to a special, for example more favorable charging tariff. Usually, this is accomplished in that the subscriber notifies to his network operating company individual call numbers for which the special, favorable tariff is to apply. The data transmitted by the subscriber must be recorded by the network operating company and included in its accounting system. After the call/charges data of the subscriber have been compiled within a network, the evaluation of these data takes place by means of the accounting system; in this case, on the basis of the input of registered customer information, a corresponding accounting of charges in respect of selected call destinations takes place. In this case, a large administrative expenditure arises for the network operating company in the administration of the call numbers designated by the customer, so that specific handling routines within the accounting systems are sought.

Known methods exhibit certain disadvantages even for the subscriber, since, although as a rule the subscriber seldom changes his call destinations selected for a favorable tariff, a change is nevertheless inconvenient since the subscriber has to notify the network operating company in oral or written form of any change to the desired destination call number. In some cases, "through connection" of the altered destination call number does not take place immediately, but with a certain delay.

SUMMARY OF THE INVENTION

The object of the present invention is to propose a method for call establishment and for the accounting of calls in telecommunications networks for specified destination call numbers which can be selected individually by the subscriber, which method is substantially more customer-friendly than the known methods and promises to the network operating company a lower administrative expenditure for the administration and accounting of charges.

The invention is based on making it possible for the subscriber independently to file individual, frequently used destination call numbers in a databank of the telecommunications network and later to use these through a simple dial procedure via his terminal. For the data entry, i.e. the specification of the desired destination call numbers, the subscriber initiates, by means of the dial procedure which is customary for him, the establishment of a call to a service identification number stipulated in the network. In this case, the dial information includes in a first variant not only the service identification number but also the destination call number which is to be programmed and which is to be filed in the databank which is individual to the subscriber. By dialing the service identification number, the call to a specialized service technical system within the network is through-connected. A databank entry is set up for the subscriber by reference to his own call number which is known to the network, under which entry the destination call number for which the desired, special charging tariff is to apply is filed.

Alternatively, it is provided that the subscriber only dials the network service through input of the service identification number, and the destination call number is requested via a voice output unit or the like. The subscriber can then input the desired destination call number by subsequent dialing.

In this case, the entry of the datum specific to the subscriber in a databank of a selected service node requires no prior notification appertaining to this service to the network operating company.

After a databank entry for the subscriber has been set up in the network in this way, the subscriber can use the service as often as he wishes under an abbreviated call number allocated to the destination call number which has been input As a rule, the abbreviated call number is known in advance and is firmly allocated to the service identification number for the programming of the databank entry. In this case, any call establishment which is initiated by means of dialing the abbreviated call number leads again to the specialized network technical system. By reference to the subscriber call number, this system then searches in its databank for the subscriber entry stored under the abbreviated call number. Following a successful search, the further call establishment to the destination terminal is executed by reference to the destination call number allocated to the entry.

Thus, the final result is the call between the calling subscriber and the desired call partner. In this case, the processing by the service logic does not give rise to any delay in the call establishment which can be detected by the calling subscriber. The service identification number which is prescribed by the network and which has been dialed by the subscriber may be considerably shorter than the call number allocated to the destination terminal.

As for any other outgoing call from the subscriber, a call data record is set up for the call, which data record enables the call to be appropriately charged. By reason of the fact that the specifically dialed call number, namely the service identification number, is included in this as destination information, the accounting system is able to allocate the special tariff to this call.

The method described herein combines the possibilities of an intelligent call number conversion in accordance with individual subscriber specifications with a simple, subscriber-specific accounting mechanism. In this case, the subscriber is able independently to store, within the network, the information necessary for his service, without an administrative procedure by his network operating company.

At the same time, the method makes it possible for the subscriber, via abbreviated call numbers administered within the telecommunications network, to simplify the dialing of frequent call partners.

As a result of the combination of the above mechanism with methods based on customary accounting systems, it becomes possible to support a special accounting of charges for subscriber-individual call destinations.

The method does not require any special hardware expenditure and supports any telecommunications networks and systems in which, for the establishment of a call, the transmission of destination call numbers and origin call numbers is guaranteed. Examples of this are, in particular, public networks with ISDN (ISUP) or TUP signaling and private networks with Q-SIG or ISDN (DSS1) signaling.

However, older networks with for example R2, IKZ50 dial procedures are also suitable in principle. In this case, public and private networks can support both analog and digital transmission technology, transmit telephony or data, and form a fixed network and also a radio network. The service logic of the method is based on a central service node and a service databank which communicates with the exchanges of the telecommunications network and controls the latter. A typical implementation of such a basis is formed by the IN (Intelligent Network) technology.

DETAILED DESCRIPTION OF THE INVENTION

Figure 1:
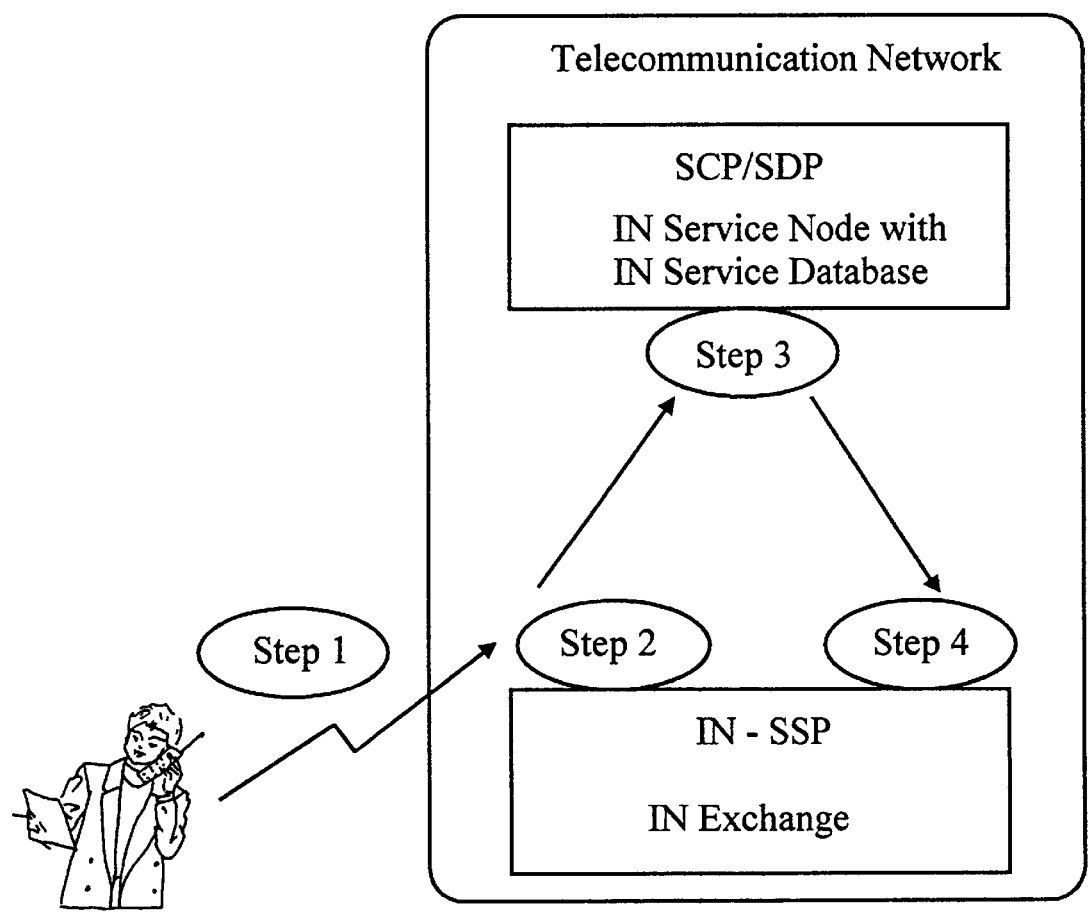
FIG. 1 is a diagram illustrating the steps for entry of a specific destination call number, according to the present invention.

The present invention will now be explained in greater detail by reference to an example, with the aid of Tables 1 and 2 and the drawings, FIGS. 1 and 2. In the example, a mobile telecommunications network according to the GSM standard is assumed.

According to FIG. 1, the entry of the specific destination call number desired by the subscriber takes place in the following manner:

Step 1:

The subscriber having the call number R dials a service identification number P1 for programming, followed by a destination call number Z1. Where the closest subscriber exchange has no IN functionality, the service identification number P1 serves in the first instance to address a suitable IN exchange, in order to create the exchange between subscriber terminal (in this example, the air interface of a radio network) and the IN exchange (IN-SSP).

In the Example:

The subscriber having the call number 0171-xx.. dials the service identification number, e.g. 01704, followed by the destination call number 0228-yy...

Step 2:

The dialed service identification number P1 is recognized in the IN exchange (IN-SSP) and thereupon a message containing all relevant information, i.e. subscriber call number R and destination call number Z1 is sent to the IN service node (Service Control Point, SCP).

In the Example:

The dialed service identification number 01704 is recognized in the integrated GSM/IN exchange and a message containing all relevant information, subscriber call number 0171-xx.. and destination call number 0228-yy.. is sent to the IN service node.

Step 3:

The service node (SCP) recognizes the specific service by reference to the service identification number P1. In the first instance, a determination is made as to whether a databank entry is already in existence for the subscriber having the call number R. If this is not the case, then a new databank entry is set up for this subscriber. In this case, a determination is made by reference to a global table filed in the databank, as to which of the possible entries 1 to m of the subscriber is involved.

In the Example:

The service node sets up, in its databank, a subscriber entry for the subscriber 0171-xx... Under this entry, the destination call number 0228-yy.. is stored under a first abbreviated call number N1 (=e.g. 01701).

TABLE 1

Allocation of the identification numbers for programming and use of the service

| Entry number | Service identification number for programming | Abbreviated call number (service identification number for use) |
|---|---|---|
| 1 | 01704 | 01701 |
| 2 | P2 | N2 |
| . | . | . |
| . | . | . |
| . | . | . |
| m | Pm | Nm |

The service node (SCP) then sets up, in its databank, a new subscriber entry for the subscriber having the call number R (Table 2). Under this entry, the destination call number Z1 (=0228-yy..) is stored as first destination call number in accordance with the entry number 1 found in Table 1. Accordingly, on a basis individual to the subscriber concerned, the following permanent databank entry is created in the databank of the IN service node:

TABLE 2

Subscriber databank. Databank structure of the subscriber-specific entries

| Subscriber number | Destination call No. 1 | Destination call No. 2 | Destination call No.. | Destination call No. m |
|---|---|---|---|---|
| 0171-xx.. | 0228-yy.. | Z2 | ... | Zm |
| ... | ... | ... | ... | ... |
| ... | ... | ... | ... | ... |
| ... | ... | ... | ... | ... |

Step 4:

The IN-IP (Intelligent Peripheral) of the exchange generates an acknowledgement announcement for the subscriber in order to signal the successful handling of the databank entry, and nominates the abbreviated call number N1 allocated to the destination call number Z1 which has been input.

In the Example:

The IN-IP of the exchange generates, for example, the announcement "many thanks, your destination call number 0228-yy.. has been successfully entered. You can now use this by dialing 01701".

In another embodiment of the invention, it is provided to offer an alternative user service for the subscriber. In order to make it easier for the subscriber to handle the service, it is provided that the subscriber in the first instance dials only the abbreviated service identification number e.g. 01704, which initiates the IN service. The subscriber is then requested, via a voice output function of the intelligent network (Intelligent Peripheral), to input the destination call number. Typically, such an input takes place for example via DTMF dial tones which are transmitted in the voice band. The handling of the destination call number, called up by the IP, in the IN service node then takes place in a manner corresponding to the above steps 2 to 4.

Figure 2:
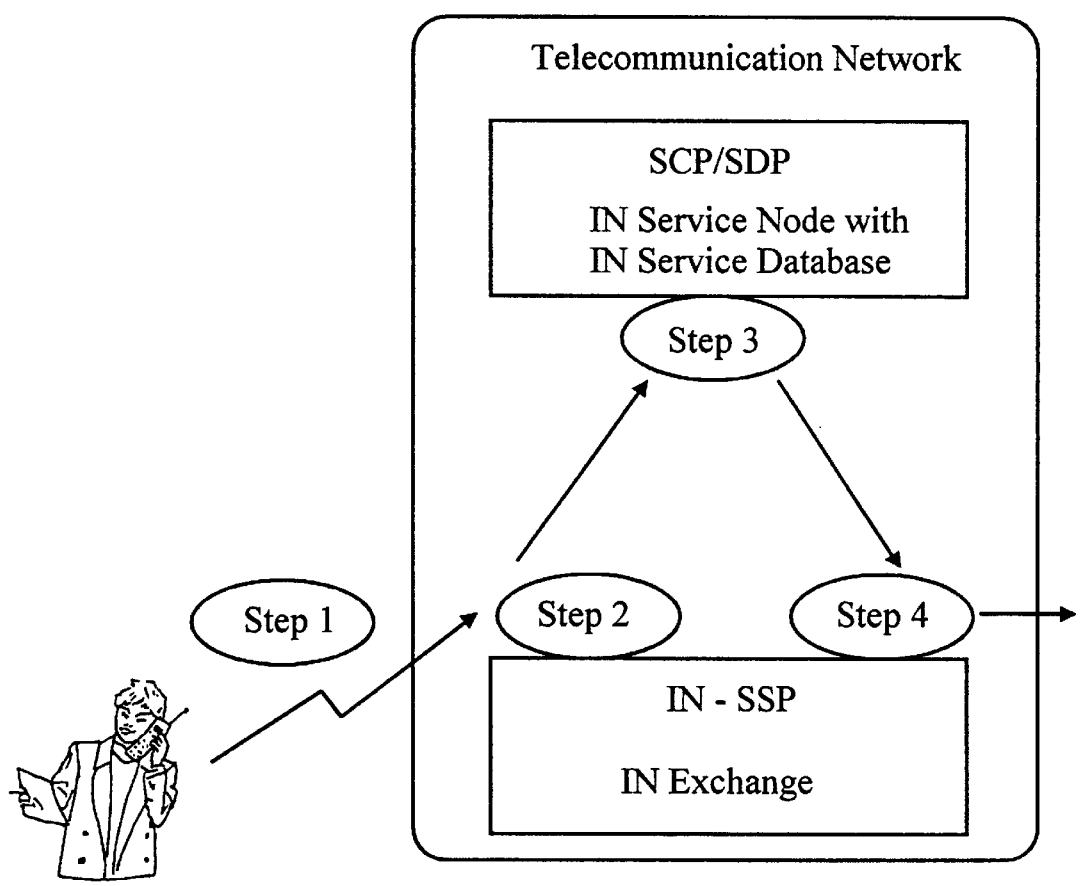
FIG. 2 is a diagram illustrating the steps for use of the service, according to the present invention.

The use of the service according to the invention by the subscriber takes place in a manner corresponding to FIG. 2:

Step 1:

The mobile telephone subscriber having the call number R dials the service identification number N1, which was allocated to a destination call number which was programmed in in advance. Where the subscriber exchange has no IN functionality, the service identification number serves in the first instance only to address a suitable IN exchange, in order to create the connection between subscriber terminal (in this example, an air interface of a radio network) and the IN exchange (IN-SSP).

In the Example.

The mobile telephone subscriber having the call number 0171-xx.. dials the abbreviated call number 01701.

Step 2:

The dialed service identification number N1 is recognized in the IN exchange and subsequently a message containing the relevant information (service identification number N1, subscriber call number R) is sent to the IN service node.

In the Example:

The dialed abbreviated call number 01701 is recognized in the integrated GSM/IN exchange, and a message containing all relevant information is sent to the IN service node.

Step 3:

On the basis of Table 1 (see above), the service node recognizes that the service described here and a desired use of the first destination call number Z1 are involved. Thereupon, the first destination call number Z1 is requested from the subscriber databank, Table 2, by reference to the subscriber data in the entry for the call number R. By this call number, the service node initiates the further establishment of the call to the subscriber having the call number Z1.

In the Example.

The service node searches for the subscriber entry belonging to the subscriber call number 0171-xx... Following a successful search, the node reads the destination call number 0228-yy.., allocated to the abbreviated call number 01701, of the subscriber entry and initiates the further call establishment.

Step 4:

Thereupon, the IN exchange creates the connection of the calling subscriber with the destination call number In the Example:

Accordingly, the destination call number 0228-yy.. is dialed as destination call number by the service node and the exchange.

In the telecommunications network, a call data record is generated for each outgoing call, including for calls involving the use of the abbreviated call numbers. By reference to the abbreviated call number which is included in this data record, the accounting system recognizes that a call was established with the use of the method according to the invention. The allocation of tariffs in dependence upon the destination call number allocated to the abbreviated call number and, in certain circumstances, upon further other parameters, is a basic functionality of a modern accounting system. Accordingly, it is possible to allocate a special separate tariff to the service identification number or abbreviated call number N1 which was used as dial information appertaining to the call to the destination call number Z1, and thus to offer to the customer a special mode of accounting appertaining to the calls established via the abbreviated call numbers.

An advantage of the described method is that the subscriber himself is able, without "active" assistance from the network operating company, to store his desired call number for which he desires a special accounting tariff. The stored data can be changed by the customer at will, but within a stipulated time frame, e.g. twice per month. The method is suitable both for mobile telephone networks and also for fixed networks, and can be implemented by the network operating company with low expenditure. It is of substantial importance that, after successful installation of this service, no further administrative activities are necessary any longer from the point of view of the network operating company. The modern IN exchange technology which is in widespread use permits simple implementation of this method, since the required basic prerequisites are already satisfied.

No modifications to the existing integrated exchange systems for administration, accounting and distribution support are to be expected.

Abbreviations and terms employed:

IN Intelligent Network

IP Intelligent Peripheral (unit for announcements and, for example, DTMF recognition)

SSP Service Switching Point

SCP Service Control Point

What is claimed is:

1. A method for call establishment and for the accounting of calls in telecommunitions networks for specified destination call numbers which can be selected individually by a subscriber, comprising notifying, by the subscriber, a telecommunications network operating company of a limited number of destination call numbers which are filed in a databank provided in a service node of the network, allocating in the databank to the destination call number an abbreviated call number which the subscriber is then able to dial as frequently as he whises, determining after the abbreviated call number has beendialed the associated destination call number in the databank,establishing a call to the destination call number, charging all calls dialed via the abbreviated call number under a special tariff allocated to the abbreviation call number, filing, by the subscriber, without prior notification appertaining to this service to the telecommunications network operating company, the individually selected destination call number in the databank, wherein the subscriber dials a service identification number internal to the network in order to obtain access to the databank, and examining, in the service node, whether a databank entry is already in existence, and if not, a new databank entry for a subscriber call number is set up, and the destination call number is filed in the databank under a successive entry number.

2. The method as claimed in claim 1, wherein the subscriber inputs his selected call numbers via the keypad of his telecommunications terminal.

3. The method as claimed in claim 1, wherein the databank contains a global data record which essentially includes the following information:

number of the possible entry (1-m), possible service identification numbers for the programming of the databank entries by the subscriber (P1–Pm), the abbreviated call numbers (N1–Nm) allocated to the service identification numbers.

4. The method as claimed in claim 2, wherein the databank contains a global data record which essentially includes the following information:

number of the possible entry (1-m), possible service identification numbers for the programming of the databank entries by the subscriber (P1–Pm), the abbreviated call numbers (N1–Nm) allocated to the service identification numbers.

5. The method as claimed in claim 1, wherein the databank contains a data record which is individual to the subscriber and which essentially includes the following information;

the subscriber call number, the destination call numbers which have been input by the subscriber and which are allocated to abbreviated call numbers.

6. The method as claimed in claim 1, wherein to program databank entries the service identification number dialed by the subscriber with the destination call number is recognized by an exchange and the service identification number, together with the subscriber call number and the destination call number, is transmitted to the service node.

7. The method as claimed in claim 1, wherein the abbreviated call number dialed by the subscriber is recognized by an exchange and the abbreviated call number together with the subscriber call number is transmitted to the service node.

8. The method as claimed in claim 1, wherein, in the service node, the successive entry number stored in the databank and the destination call number are determined by reference to the subscriber call number and the abbreviated call number, and the establishment of a call to the destination call number takes place.

9. the method as claimed in claim 1, wherein the establishment of a call involving the use of the abbreviated call number is recognized by an accounting system, and the call is charged with consideration given to the abbreviated call number.

* * * * *